(12) United States Patent
Trebbi

(10) Patent No.: US 10,745,163 B2
(45) Date of Patent: Aug. 18, 2020

(54) DOSING APPARATUS FOR POWDER PRODUCTS

(71) Applicant: I.M.A. INDUSTRIA MACCHINE AUTOMATICHE S.P.A., Ozzano dell'Emilia (BO) (IT)

(72) Inventor: Claudio Trebbi, Ozzano dell'Emilia (IT)

(73) Assignee: I.M.A. INDUSTRIA MACCHINE AUTOMATICHE S.P.A., Ozzano Dell'Emilia (BO) (IT)

(*) Notice: Subject to any disclaimer, the term of this patent is extended or adjusted under 35 U.S.C. 154(b) by 54 days.

(21) Appl. No.: 16/074,884

(22) PCT Filed: Feb. 1, 2017

(86) PCT No.: PCT/EP2017/052149
§ 371 (c)(1),
(2) Date: Aug. 2, 2018

(87) PCT Pub. No.: WO2017/134103
PCT Pub. Date: Aug. 10, 2017

(65) Prior Publication Data
US 2019/0077531 A1 Mar. 14, 2019

(30) Foreign Application Priority Data
Feb. 3, 2016 (IT) .................. 102016000011075

(51) Int. Cl.
*B65B 37/10* (2006.01)
*B65B 65/02* (2006.01)
*H02K 49/10* (2006.01)

(52) U.S. Cl.
CPC .............. *B65B 37/10* (2013.01); *B65B 65/02* (2013.01); *H02K 49/104* (2013.01); *H02K 49/106* (2013.01); *H02K 49/108* (2013.01)

(58) Field of Classification Search
CPC .................................................. B65B 37/10; B65B 65/02; B65B 3/24; B65B 1/24; B65B 1/20; B65B 1/04;
(Continued)

(56) References Cited

U.S. PATENT DOCUMENTS

| 2,589,583 A | 3/1952 | Thompson | |
| 3,616,968 A * | 11/1971 | James | B65B 1/30 |
| | | | 222/643 |

(Continued)

FOREIGN PATENT DOCUMENTS

| CN | 104290935 | | 1/2015 |
| CN | 104290935 A * | | 1/2015 |

(Continued)

OTHER PUBLICATIONS

DE-3136132-A1 English Translation of Specification (Year: 1982).*
(Continued)

*Primary Examiner* — Marina A Tietjen
*Assistant Examiner* — Stephanie A Shrieves
(74) *Attorney, Agent, or Firm* — Wenderoth, Lind & Ponack, L.L.P.

(57) ABSTRACT

A dosing apparatus for dosing a product in powder and/or granule form within containers includes a hopper (2) provided with an internal cavity (3) to contain the product, a dosing screw (4) rotatable about, and extending along, a rotation axis (X) inside the hopper and through the internal cavity, and a first driving shaft (5) arranged to rotate the dosing screw; the dosing apparatus also includes a magnetic coupling system (10) to removably connect a first end (6) of the dosing screw (4) to the first driving shaft (5), arranged externally to the hopper (2); the magnetic coupling system includes groups of magnets (21, 22, 23, 24) adapted to magnetically transmit a driving torque from the first driving shaft (5) to the dosing screw (4) and to reversibly fasten, (Continued)

longitudinally along the rotation axis (X), the dosing screw (4) to the first driving shaft (5); the first end (6) of the dosing screw (4) is arranged inside the hopper (2) and the first driving shaft (5) is hermetically separated from the first end (6) of the dosing screw (4) by means of a separation element (8) that is integral with the hopper (2).

20 Claims, 3 Drawing Sheets

(58) Field of Classification Search
CPC .......... B65B 1/10; B65B 1/12; H02K 49/104; H02K 49/106; H02K 49/108
USPC ............................................ 141/12, 71, 100
See application file for complete search history.

(56) References Cited

U.S. PATENT DOCUMENTS

| | | | | |
|---|---|---|---|---|
| 5,090,944 | A * | 2/1992 | Kyo | .................... B01F 13/0863 417/420 |
| 5,339,997 | A * | 8/1994 | Billivant | ............. B01F 15/0235 222/238 |
| 5,376,862 | A | 12/1994 | Stevens | |
| 5,539,266 | A | 7/1996 | Stevens | |
| 6,340,036 | B1 | 1/2002 | Toyoizumi et al. | |
| 6,417,591 | B1 | 7/2002 | Saito et al. | |
| 7,112,904 | B2 | 9/2006 | Akiyama | |
| 7,219,703 | B2 * | 5/2007 | Geltser | .............. B65G 47/1428 141/102 |
| 7,942,173 | B2 | 5/2011 | Morimoto et al. | |
| 8,575,803 | B2 * | 11/2013 | Kuritani | ............. F04C 15/0069 310/103 |
| 9,327,850 | B2 * | 5/2016 | Bailey | ....................... B65B 1/06 |
| 2005/0206260 | A1 | 9/2005 | Akiyama | |
| 2009/0020563 | A1 * | 1/2009 | Morimoto | ................. B65B 1/12 141/18 |

FOREIGN PATENT DOCUMENTS

| | | | | |
|---|---|---|---|---|
| CN | 204197326 | | 3/2015 | |
| CN | 204197326 | U * | 3/2015 | |
| CN | 204264471 | | 4/2015 | |
| CN | 204264471 | U * | 4/2015 | |
| DE | 3136132 | A1 * | 8/1982 | .......... H02K 49/106 |
| DE | 33 37 573 | | 4/1985 | |
| GB | 2 216 189 | | 10/1989 | |
| GB | 2216189 | A * | 10/1989 | .......... H02K 49/106 |
| JP | 06-241237 | | 8/1994 | |
| JP | 2000-125541 | | 4/2000 | |
| JP | 2000-332319 | | 11/2000 | |
| JP | 2005-269709 | | 9/2005 | |
| JP | 2005-289379 | | 10/2005 | |
| JP | 2010-168213 | | 8/2010 | |
| JP | 2013-18527 | | 1/2013 | |
| JP | 2014-217412 | | 11/2014 | |
| JP | 5823751 | B2 * | 11/2015 | |
| WO | WO2007/091540 | | 8/2007 | |
| WO | WO-2015172173 | A2 * | 11/2015 | |

OTHER PUBLICATIONS

JP-5823751-B2 English Translation of Specification (Year: 2015).*
Japanese Office Action dated Sep. 24, 2019 in corresponding Japanese Patent Application No. 2018-540775 with English translation.
International Search Report dated Apr. 24, 2017 in International (PCT) Application No. PCT/EP2017/052149.

* cited by examiner

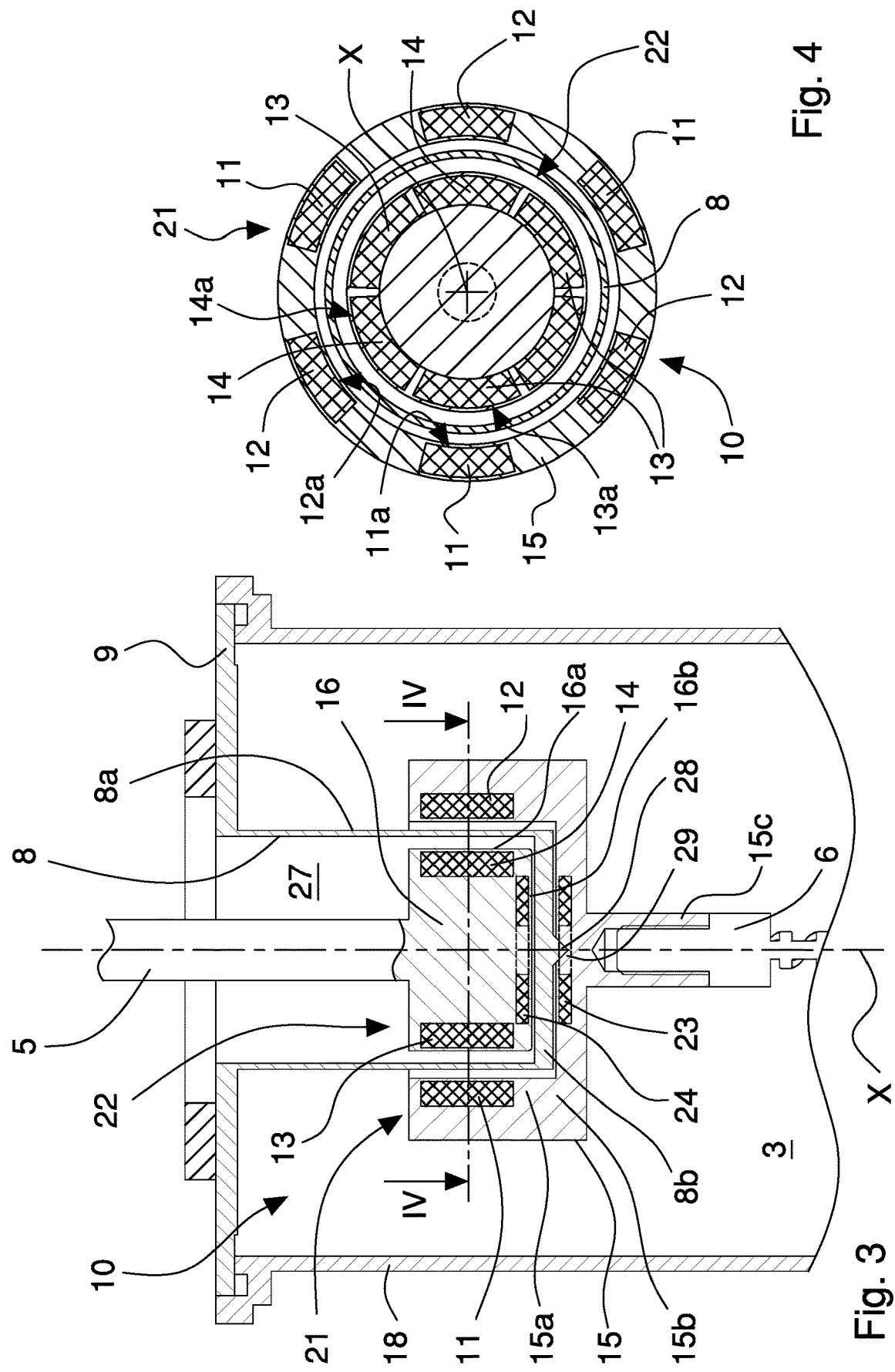

DOSING APPARATUS FOR POWDER PRODUCTS

The invention refers to apparatuses for dosing products into containers and in particular it refers to a dosing apparatus that is associable to an automatic packaging machine in order to dose or meter precise amounts of a product in a powder and/or granule form within containers such as bottles, phials, vials, small bottles and alike.

In the prior art automatic packaging machines employed in the pharmaceutical, cosmetic and food field for filling containers with products in powder and/or granule form, it is known the use of volumetric dosing apparatuses provided with a dosing screw that is arranged to draw the product from a tank or hopper and dose it within the containers.

In fact, the dosing screw has, along a respective longitudinal axis, a helical groove that forms, with a through cylindrical seat wherein said screw is inserted with small clearance, a cavity for containing and moving the product that has a specific and known volume for length unit or pitch. In this way, by rotating the screw about the longitudinal axis of a given angle, it is possible to linearly advance for a corresponding quantity a fixed and precise dose of product, which exits through an end opening of the cylindrical seat and falls into the underneath container.

The size and the shape of the screw (internal and external diameters, pitch of the helical groove) are selected according to the amount of the dose to be dosed in the containers and to the type of product in powder and/or granule.

The screw rotation motion is usually intermittent and coordinated with the advancing motion of the containers of the packaging machine.

The screw is rotated, directly or through the interposition of a speed reducer unit, by a rotary engine, typically of electric type, that is positioned inside the dosing apparatus or the packaging machine and in an area that is hermetically separated from the product hopper of the dosing apparatus for hygiene and cleaning purposes.

In the packaging of pharmaceutical products, in particular for parenteral use, it is necessary and required by the legislation on the pharmaceutical packaging that all the elements and components of the dosing apparatus coming into contact with the product, are clean, sanitized and sterile, and properly separated from the non-sterile areas of the apparatus (e.g. containment compartments for devices, mechanisms, engines, etc.) that would compromise the sterility of the dosing and packaging process.

In the dosing apparatuses with screw, the latter typically includes a first operative part that is provided with the helical groove and extends inside the hopper of the product and a second supporting part extending inside the dosing apparatus to couple with the driving members. Suitable sealing systems are provided, in particular annular gaskets, for hermetically separating the internal area of the apparatus, wherein the driving members and mechanisms are housed, from the internal part of the hopper in order to avoid the passage into the product of particles, substances, extraneous elements that would contaminate and compromise the product hygiene and sterility. In general, the sealing systems include one or more annular gaskets that are mounted on respective seats of a supporting body or structure of the dosing apparatus and abut on a cylindrical external wall of the second supporting part of the screw.

The sealing gaskets must guarantee separation and insulation between the internal area of the dosing apparatus and the inside of the hopper even when the latter undergoes washing and sterilization processes at the end of the production. In other words they must prevent the transfer of liquids and/or vapour at high pressure and temperature that would damage driving and moving parts and components of the dosing apparatus and/or the packaging machine.

A drawback of the prior art dosing apparatuses provided with the previously mentioned sealing systems is that the gaskets are particularly expensive since they must be manufactured with a material suitable for the contact with both pharmaceutical products and washing and sterilizing agents at high temperature. Moreover, since the gaskets are mechanically and physically stressed during the normal functioning and particularly during the washing and sterilisation processes, they must be frequently replaced requiring to stop the dosing apparatus, the packaging machine and the production. Besides the time and the costs required for replacing the gaskets (screw dismounting/remounting) it must be added the costs and time necessary for washing and sterilizing at least the dosing apparatus after the gaskets replacement in order to make it suitable for the production.

Sealing gaskets can also form, over time and in use, with the seats housing them and/or with the surfaces matching them, cracks, fissures, receptacles and similar wherein the product in powder and/or granule form can deposit and stay even after the washing and sterilization processes thus contaminating a following production batch.

Another drawback of the prior art dosing apparatuses is that, since the screw is designed and sized according to the product characteristics and especially to the dosage to be performed, the screw must be replaced as well as the whole dosing apparatus in case the packaging machine must dose a different amount of product in a following production batch. However, in order to replace the screw or the dosing apparatus it is necessary to stop the packaging machine and consequently the production for a considerable time lapse and then to perform the necessary washing and sterilization processes to make the dosing apparatus suitable for production.

An object of the present invention is to improve the known dosing apparatuses that are associable to an automatic packaging machine for dosing within containers precise quantities of a product in powder and/or granule form, in particular the dosing apparatuses provided with dosing screw.

Another object is to provide a dosing apparatus for powder products that allows a complete and safe separation and insulation between the hopper containing the product and the inner members and mechanisms for driving the dosing screw.

A further object is to provide a dosing apparatus that allows a quick and easy replacement of the dosing screw in order to have a high production flexibility.

A still further object is to provide a dosing apparatus having a simple and robust structure and a precise and reliable functioning.

These and other objects are achieved by a dosing apparatus according to one or more hereinafter related claims.

The invention will be better understood and implemented with reference to the enclosed drawings, showing some illustrative and non-limiting embodiments, wherein:

FIG. 3 is a partial enlarged view of the section of FIG. 2;

FIG. 4 is a section according to line IV-IV of FIG. 3;

Figure 2:
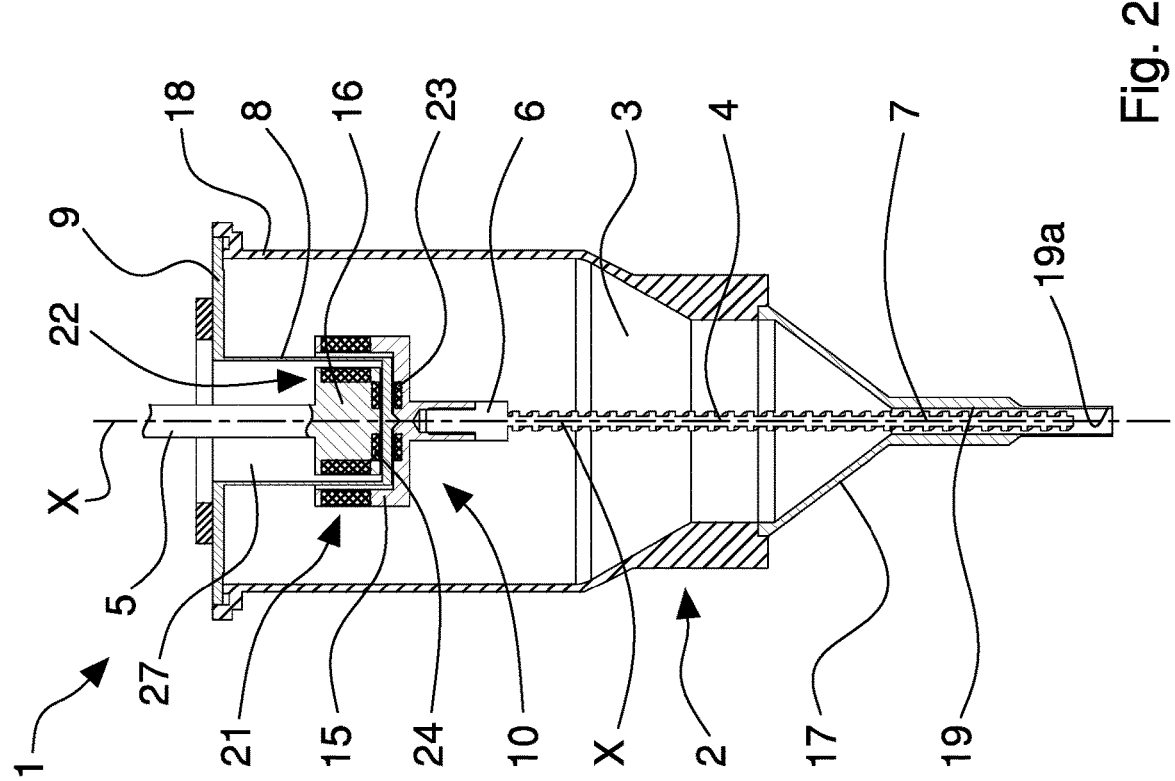
FIG. 2 is a section according to line II-II of FIG. 1.
Figure 1:
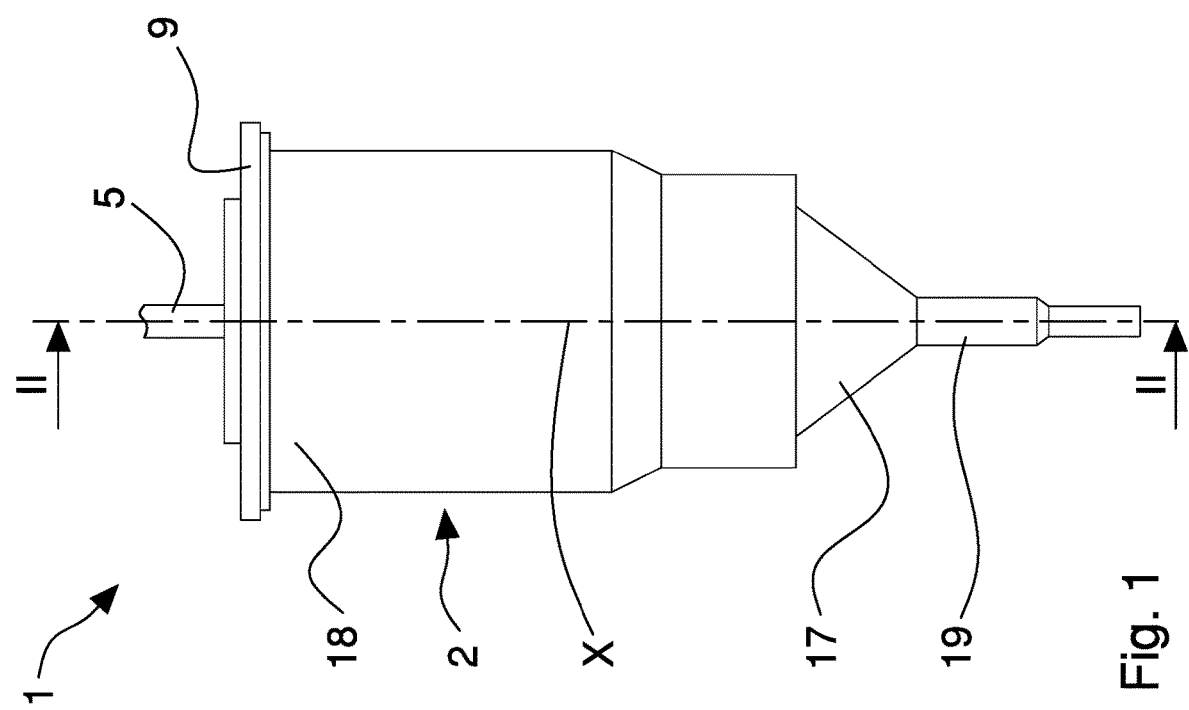
FIG. 1 is a front view of the dosing apparatus of the invention.

With reference to FIGS. 1 to 4, a dosing apparatus 1 is shown that is arranged for dosing a product in powder and/or granule form within containers, and in particular that is associable to an automatic packaging machine usable in the pharmaceutical, cosmetic or food field.

The dosing apparatus 1 includes a hopper 2 provided with an internal cavity 3 suitable for receiving and containing the product, a dosing screw 4 rotatable about, and extending along, a rotation axis X within the hopper 2 through the internal cavity 3, and a first driving shaft 5 arranged to rotate the dosing screw 4.

The first driving shaft 5 is connected and rotated by respective driving means of the packaging machine, of known type and not shown in the figures.

The apparatus 1 also includes a magnetic coupling system 10 that removably connect a first end 6 of the dosing screw 4, which is arranged inside the hopper 2, to the first driving shaft 5, which is arranged on the contrary externally to the hopper 2 and is hermetically separated from the first end 6 and from the internal cavity 3 by means of a separation element 8 of the hopper 2. The magnetic coupling system 10 includes groups of magnets 21, 22, 23, 24 adapted to transmit magnetically a driving torque from the first driving shaft 5 to the dosing screw 4 and to fasten reversibly, longitudinally along the rotation axis X, the dosing screw 4 to the first driving shaft 5.

The magnetic coupling system 10 includes a first rotor 15, which is fixed to the first end 6 of the dosing screw 4 within the hopper 2 and is provided with a first group of magnets 21, and a second rotor 16, which is fixed to an end of the first driving shaft 5 externally to the hopper 2 and is provided with a second group of magnets 22. The first rotor 15 and the second rotor 16 are mutually and physically separated by the separation element 8 and arranged so that the first group of magnets 21 and the second group of magnets 22 substantially face each other so as to interact and generate a force of mutual magnetic attraction directed at least transversally, in particular orthogonally, to the rotation axis X.

The first end 6 of the dosing screw 4 is fixed, e.g. screwed, to a connecting stem 15c of the first rotor 15 that is coaxial to the rotation axis X.

The hopper 2 includes a body composed of an upper portion 18 having a substantially cylindrical shape and a bottom portion 17 having a conical part converging towards a cylindrical part that is provided with a pass-through cavity 19 arranged to receive the dosing screw 4 and having a terminal opening 19a through which the product to be dosed into the containers exits. More precisely, the pass-through cavity 19 receives a second operative end 7 of the dosing screw 4 and cooperates with the latter to dose the product. The upper portion 18 of the hopper includes, for example, a first cylindrical-shaped section, along the rotation axis X and towards the bottom portion 17, a second conical section converging towards a third cylindrical section adjacent to the bottom portion 17. The bottom portion 17 of the hopper 2 is removably fixed to the upper portion 18, in particular to the third section of the latter, and it can be dismounted and removed in order to allow removing or inserting, that is dismounting or mounting, the dosing screw 4 and the first rotor 15 from/in the hopper 2.

The separation element 8 includes a casing, in particular having a cylindrical cup shape, that extends within the internal cavity 3 starting from a closing wall 9 of the hopper 2, the closing wall 9 being opposite to a terminal opening 19a. The separation element 8 forms an internal compartment or housing 27 with an open top, hermetically separated from the internal cavity 3 and adapted to be externally accessible, in particular to receive and contain the second rotor 16 of the magnetic coupling system 10. More precisely, the separation element 8 includes a separation lateral wall 8a, substantially cylindrical, and a separation front wall 8b, flat and circular, that is connected to said separation lateral wall 8a so as to form the internal housing 27.

The closing wall 9 is removably fixed to the upper portion 18 of the hopper 2 so that it can be dismounted and removed to allow getting into to the internal cavity 3. The closing wall 9 further comprises an opening for getting into the internal housing 27 of the separation element 8 from the outside.

The separation element 8 is integral with the hopper 2 or constitutive of the latter, namely the separation element 8 is to be understood as a part that forms a body of the hopper 2. In particular, with reference to the embodiment illustrated in figures the separation element 8 forms with the closing wall 9 a single body. In another embodiment of the present invention, not illustrated, the separation element 8 is fasten to the closing wall 9.

The separation element 8, the closing wall 9, the upper portion 18 and the bottom portion 17 contribute to form the whole body of the hopper 2 as operational unit. The separation element 8 can be made of a non-magnetic material, in particular a ceramic material, in order to not disrupt or alter the magnetic interaction between the groups of magnets 21, 22 of the first rotor 15 and the second rotor 16.

The first rotor 15 includes an annular lateral portion 15a that contains the first group of magnets 21 and that, in an assemblage configuration of the magnetic coupling system 10, is arranged around the separation lateral wall 8a of the separation element 8, spaced apart from the latter so as to leave a respective air gap having a definite thickness. The second rotor 16 includes a lateral wall 16a that is provided with the second group of magnets 22 and that, in an assemblage configuration of the magnetic coupling system 10, faces the separation lateral wall 8a from which it is spaced apart so as to leave a respective air gap having a definite thickness.

The first rotor 15 also includes a base portion 15b that is connected to the annular lateral portion 15a with which it forms a compartment adapted to contain an end part of the separation element 8 and, inside said end part, the second rotor 16. The first group of magnets 21 includes a plurality of first magnets 11, with respective operative surfaces 11a facing the second group of magnets 22 and having positive polarity, and a plurality of second magnets 12, with respective operative surfaces 12a facing the second group of magnets 22 and having negative polarity. The first magnets 11 and the second magnets 12 are radially arranged around and along the rotation axis X, angularly spaced and mutually alternated, a first magnet 11 being arranged between two second magnets 12 and vice versa.

Likewise, the second group of magnets 22 includes a plurality of third magnets 13 having respective operative surfaces 13a facing the first group of magnets 21 and having positive polarity, and a plurality of fourth magnets 14 having respective operative surfaces 14a facing the first group of magnets 21 and having negative polarity. The third magnets 13 and the fourth magnets 14 are radially arranged around and along the rotation axis X, angularly spaced and mutually alternated, a third magnet 13 being arranged between two fourth magnets 14 and vice versa.

The magnetic coupling system 10 also includes a third group of magnets 23 housed in said first rotor 15 and a fourth group of magnets 24 housed in the second rotor 16, the third group of magnets 23 and the fourth group of magnets 24 facing each other and being arranged so as to exert a mutual magnetic attraction force directed along the rotation axis X.

The third group of magnets 23 is housed in the base portion 15b of the first rotor 15 facing the front separation wall 8b of the separation element 8 and the fourth group of magnets 24 is housed in a front portion 16b of the second rotor 16 facing the said front separation wall 8b.

The third group of magnets 23 and the fourth group of magnets 26 include respective annular magnets, arranged coaxially to the rotation axis X and in such a way that respective frontal surfaces of opposite polarity face each other. Thus, the third group of magnets 23 and the fourth group of magnets 26 generate a magnetic attraction force that keeps the first rotor 15 fastened to the second rotor 16 along the rotation axis X.

A guiding assembly 28, 29 is provided to rotatably guide and support the first rotor 15 about the separation element 8 and about the rotation axis X.

The guiding assembly includes a tip 28 that is fixed to the front separation wall 8b of the separation element 8 and is substantially coaxial to the rotation axis X and a respective seat 29 that is associated to the base portion 15b of the first rotor 15 and intended to receive and to couple with said tip 28. The tip 28 can be directly made on the front separation wall 8b as a single body or it can be a separate element that is fixed to the front separation wall 8b. Likewise, the seat 29 can be directly made on the base portion 15b or on an insert element that is put in and fixed to the base portion 15b. The tip 28 and the seat 29, which are made of materials with low friction coefficient, e.g. ceramic materials of different hardness, guide the rotor 15 in rotation about the rotation axis X and maintain the rotor 15 spaced apart from the separation element 8, in particular they maintain the two facing surfaces of the front separation wall 8b and of the base portion 15b separated, so as to form a respective air gap having definite thickness.

In the functioning of the dosing apparatus 1 of the invention, the second rotor 16, rotated by the first driving shaft 5 about the rotation axis X, thanks to the magnetic coupling system 10 rotates the first rotor 15 and thus the dosing screw 4. In fact, the first group of magnets 21 and the second group of magnets 22 generate a magnetic field that mutually fasten the first rotor 15 and the second rotor 16 around and along the rotation axis X through the separation element 8 made of non-magnetic material for this reason. The first magnets 11 and the second magnets 12 of the first group of magnets 21 interact with the third magnets 13 and the fourth magnets 14 of the second group of magnets 22 in such a way that a rotation driving torque is transmitted magnetically from the second rotor 16 to the first rotor 15. The magnets 11, 12, 13, 14 arranged mutually alternated around and along the rotation axis X also allow to couple angularly, in a precise and secure way, the two rotors 15, 16 in order to rotate accurately the dosing screw 4, without play or angular slipping, for an optimal dosing of the product into the containers. The magnets 11, 12, 13 14 of the first group of magnets 21 and second group of magnets 22 generate a magnetic field that further allows to fasten longitudinally along the rotation axis X the dosing screw 4 to the first driving shaft 5. Thus, if the dosing apparatus 1 is mounted on the packaging machine with the rotation axis X that is substantially vertical, the first group of magnets 21 and the second group of magnets 22 keep the first rotor 15 and the dosing screw 4 connected and coupled to the second rotor 16 and to the first driving shaft 5.

The magnetic coupling between the two rotors 15, 16 along the rotation axis X is also guaranteed by the respective annular magnets of the third group of magnets 23 and the fourth group of magnets 24 that generate an axial magnetic attraction force.

The magnetic force along the rotation axis X generated by the groups of magnets 21, 22, 23, 24 is in fact higher than the weight force due to the gravity and acting on the dosing screw 4 and on the first rotor 15. However, such magnetic force is not so high as to prevent an operator from easily removing the dosing screw 4 with the first rotor 15 from the second rotor 16, and extracting it from the hopper 2, for example during maintenance or cleaning of the hopper 2, after having dismounted the bottom portion 17 of the hopper 2. Thus, the dosing screw 4 can be easily and quickly replaced according to the production needs so providing a high operative flexibility to the dosing apparatus and to the packaging machine.

It should be noted that the dosing screw 4 can be replaced without dismounting the dosing apparatus 1 from the packaging machine and without endanger the sterility thereof, since a new dosing screw, previously washed and sterilised, can be mounted in the hopper.

The separation element 8 keeps hermetically separated the internal cavity 3 of the hopper 2 from the external environment, in particular it keeps the two rotors 15, 16 hermetically separated.

Unlike the prior art dosing apparatuses, no element crosses the walls of the hopper 2 creating a connection between the internal and external parts of the latter that requires using sealing gaskets. In the dosing apparatus 1 of the invention, the internal cavity 3 of the hopper 2 is in fact totally close and insulated from the outside and has no passage holes (apart from the terminal opening 19a from which the product exits) through which contaminants can enter and/or in which the product can deposit and fix.

Therefore, the dosing apparatus 1 of the invention provides a complete and secure insulation of the product during the packaging operations and a complete and excellent cleanliness and sterility of the internal cavity 3 of the hopper 2 following the washing and/or sterilisation processes at the end of production. In this case, the separation element 8 avoids potential passages or leakages of liquids and/or vapour at high pressure and temperatures outside the hopper 2 that would damage driving and moving parts and components of the packaging machine.

Figures 5, 6:
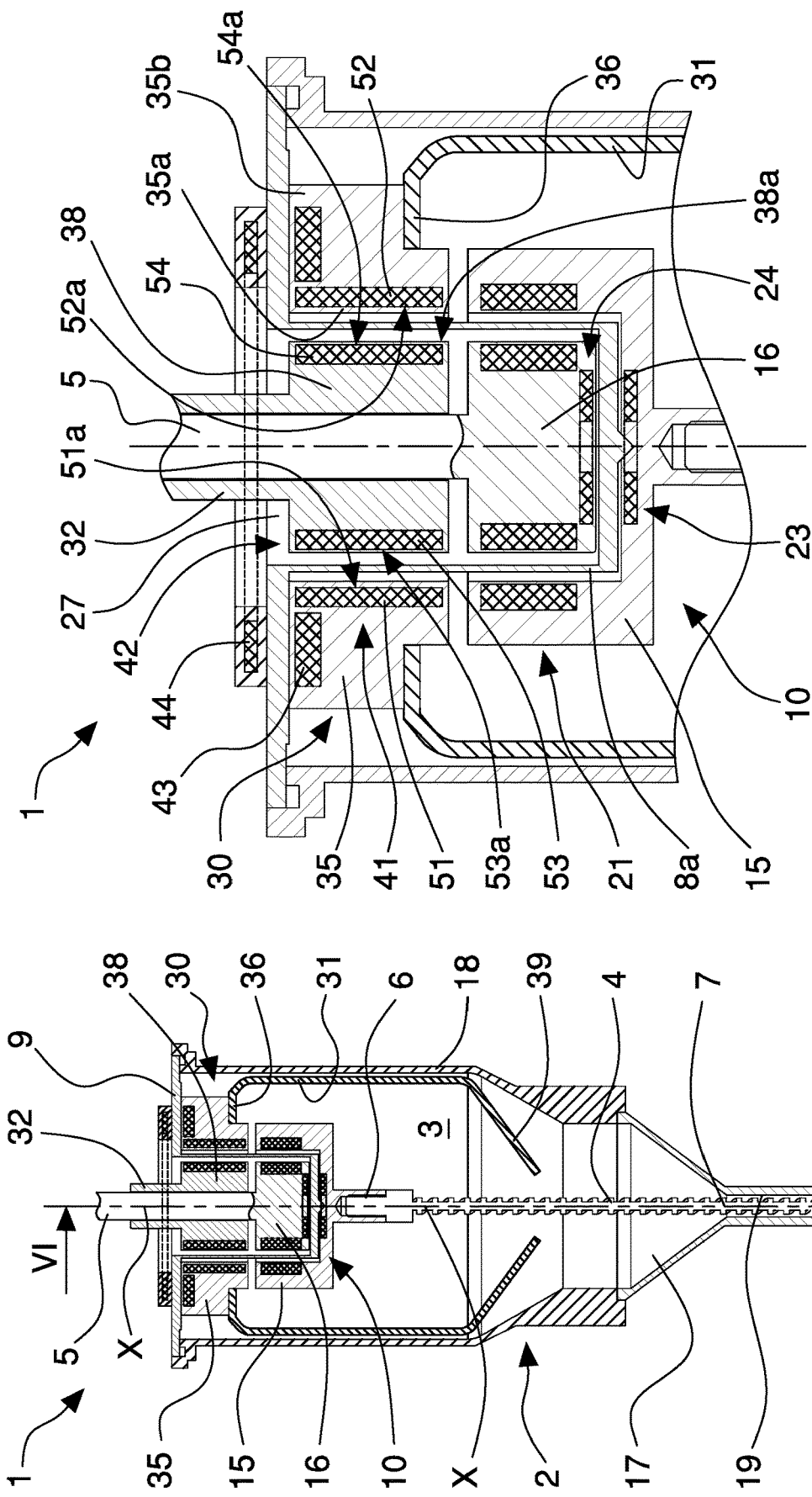
FIG. 5 is a longitudinal section of a variant of the dosing apparatus of the invention.
FIG. 6 is an enlarged and partial section according to line VI-VI of FIG. 5.

With reference to FIGS. 5 and 6, a variant of the dosing apparatus 1 of the invention is shown that differs from the previously described embodiment, shown in FIGS. 1 to 4, in that it includes a stirring element 31 that is positioned inside the internal cavity 3 of the hopper 2 and is rotatable about the rotation axis X. The dosing apparatus 1 includes a second driving shaft 32 arranged for rotating the stirring element 31 and a further magnetic coupling system 30 to removably and magnetically connect the stirring element 31 to the second driving shaft 32. More precisely, the further magnetic coupling system 30 allows to reversibly couple a first end portion 36 of the stirring element 31, which is arranged inside the hopper 2, to the second driving shaft 32, which is arranged externally to the hopper 2 and is hermetically separated from the first end portion 36 by the separation element 8.

The stirring element 31 is provided with a plurality of blades or arms 39 that have an elongated and formed shape, are fixed to the first end portion 36 and extend through the internal cavity 3 towards the bottom portion 17 of the hopper 2.

The second driving shaft 32 is connected and rotated by respective driving means of the packaging machine, of known type and not shown in the figures.

In the illustrated embodiment, the second driving shaft 32 is mounted coaxially on the first driving shaft 5.

With reference to FIG. 6, the further magnetic coupling system 30 includes further groups of magnets 41, 42, 43, 44 arranged to magnetically transmit a driving torque between the second driving shaft 32 to the stirring element 31 and to reversibly fasten longitudinally the stirring element 31 to the second driving shaft 32 along the rotation axis X.

The further magnetic coupling system 30 includes a third rotor 35, which is fixed to the first end portion 36 of the stirring element 31 inside the hopper 2 and is provided with a fifth group of magnets 41, and a fourth rotor 38, which is fixed to an end of the second driving shaft 32 externally to the hopper 2 and is provided with a sixth group of magnets 42. The fourth rotor 38 is inserted inside the internal housing 27 of the separation element 8, substantially aligned with and placed upon the second rotor 16.

In this case too, the third rotor 35 and the fourth rotor 38 are mutually hermetically separated by the separation element 8 and arranged so that the fifth group of magnets 41 face the sixth group of magnets 42 so as to interact and generate a force of mutual magnetic attraction directed at least transversally, in particular orthogonally, to the rotation axis X.

The third rotor 35 includes a respective annular lateral portion 35a arranged around the separation lateral wall 8a of separation element 8, spaced apart from the latter in order to leave a respective air gap having a definite thickness and containing the fifth group of magnets 41. The fourth rotor 38 includes a lateral wall 38a provided with the sixth group of magnets 42 and facing the separation lateral wall 8a from which it is spaced apart in order to leave a respective air gap having a definite thickness.

The fifth group of magnets 41 includes a plurality of fifth magnets 51, with respective operative surfaces 51a facing the sixth group of magnets 42 and having positive polarity, and a plurality of sixth magnets 52, with respective operative surfaces 52a facing the sixth group of magnets 42 and having negative polarity.

The fifth magnets 51 and the sixth magnets 52 are radially arranged around and along the rotation axis X, angularly spaced and mutually alternated, a fifth magnet 51 being arranged between two sixth magnets 52 and vice versa.

Likewise, the sixth group of magnets 42 includes a plurality of seventh magnets 53, with respective operative surfaces 53a facing the fifth group of magnets 51 and having negative polarity, and a plurality of eighth magnets 54, with respective operative surfaces 54a facing the fifth group of magnets 51 and having positive polarity. The seventh magnets 53 and the eighth magnets 54 are radially arranged around and along the rotation axis X, angularly spaced and mutually alternated, a seventh magnet 53 being arranged between two eighth magnets 54 and vice versa.

The further magnetic coupling system 30 also includes at least one seventh group of magnets 43 housed in a respective upper portion 35b in the third rotor 35 and at least one eighth group of magnets 44 fixed to the closing wall 9 of the hopper 2. The seventh group of magnets 43 and the eighth group of magnets 44 face each other and are arranged in order to generate a force of mutual magnetic attraction directed along the rotation axis X.

The seventh group of magnets 43 and the eighth group of magnets 44 include respective annular magnets, arranged coaxially to the rotation axis X and so that respective frontal surfaces of opposite polarity face each other.

Further guiding assembly, not shown in figures, is provided for guiding axially (along the rotation axis X) and radially (almost orthogonally to the rotation axis X) the third rotor 35 in its rotation about the rotation axis X.

The further guiding assembly includes, for example, a first guiding ring, which is arranged in the internal cavity 3, fixed to the closing wall 9 and substantially coaxial to the rotation axis X, and a second guiding ring, which is fixed to the upper portion 35b of the third rotor 35 and is coaxial to the rotation axis X. The second guiding ring is arranged for abutting and engaging an annular seat of said first guiding ring in order to avoid radial and axial movements of the third rotor 35 towards the closing wall 9.

The further guiding assembly also includes a third guiding ring that is arranged inside the internal cavity 3, fixed to the separation lateral wall 8a of the separation element 8, coaxially to the rotation axis X and arranged to abut and support a fourth guiding ring that is connected to a bottom portion of the third rotor 35, in order to avoid axial movements of the third rotor 35 towards the bottom portion 17 of the hopper 2.

The guiding rings are made of material with low friction coefficient, for example ceramic materials having different composition and/or hardness, the materials of two guiding rings mutually in contact being different in order to minimize the wear and the particle production during rotation of third rotor 35.

The functioning of further magnetic coupling system 30 is substantially equivalent to the functioning of magnetic coupling system 10.

The fifth group of magnets 41 and the sixth group of magnets 42 generate a magnetic field that fasten the third rotor 35 and the fourth rotor 38 around and along the rotation axis X through the separation element 8. The fifth magnets 51 and the sixth magnets 52 of the fifth group of magnets 41 interact with the seventh magnets 53 and the eight magnets 54 of the sixth group of magnets 42 in such a way that a rotation driving torque can be transmitted magnetically from the fourth rotor 38 to the third rotor 35.

The magnets 51, 52, 53, 54, which are arranged alternated around and along the rotation axis X, allow to angularly couple the two rotors 35, 38 in a precise and secure way in order to rotate accurately the stirring element 31, without play or angular slipping. The magnets 51, 52, 53, 54 of the fifth group of magnets 41 and of the sixth group of magnets 42 generate a magnetic field that allows fastening the stirring element 31 to the second driving shaft 32 longitudinally along the rotation axis X, in particular in case the rotation axis X is almost vertical. The fifth group of magnets 41 and the sixth group of magnets 42 maintain the third rotor 35 and the stirring element 31 connected and coupled to the fourth rotor 38 and to the second driving shaft 32.

The magnetic coupling between the fourth rotor 38 and the third rotor 35 along the rotation axis X is also guaranteed by the respective annular magnets of the seventh group of magnets 43 and the eighth group of magnets 44 generating a magnetic attraction force.

The stirring element 31 and the relative third rotor 35 can be quickly and easily dismounted from the hopper 2 by removing the closing wall 9 and the separation element 8. A different stirring element provided with a respective third rotor can be coupled to the separation element 8 and inserted in the hopper 2 in a rapid an easy way.

The invention claimed is:

1. A dosing apparatus for dosing a product in at least one form between powder form and granule form within containers, the dosing apparatus comprising:
   a hopper provided with an internal cavity to contain the product;
   a dosing screw that is able to rotate about, and extends along, a rotation axis inside said hopper and through said internal cavity;
   a first driving shaft arranged to rotate said dosing screw;
   a guide assembly; and
   a magnetic coupling system to removably connect a first end of said dosing screw to said first driving shaft that is arranged externally to said hopper,
   wherein said first end of said dosing screw is arranged inside said hopper, said first driving shaft is hermetically separated from said first end of said dosing screw by a separation element, and said separation element is integral with said hopper,
   wherein said magnetic coupling system includes a first rotor, a second rotor, and groups of magnets adapted to magnetically transmit a driving torque from said first driving shaft to said dosing screw and to reversibly fasten, longitudinally along said rotation axis, said dosing screw to said first driving shaft,
   wherein said first rotor is fixed to said first end of said dosing screw inside said hopper and is provided with a first group of magnets of said groups of magnets,
   wherein said second rotor is fixed to an end of said first driving shaft externally to said hopper and is provided with a second group of magnets of said groups of magnets,
   wherein said first rotor and said second rotor are mutually separated by said separation element and arranged so that said first group of magnets and said second group of magnets substantially face each other so as to interact and generate a force of mutual magnetic attraction directed at least transversally to said rotation axis, and
   wherein said guide assembly rotatably guides and supports said first rotor around said separation element and about said rotation axis.

2. The dosing apparatus according to claim 1, wherein said separation element includes a casing that extends inside said internal cavity and forms an internal housing that is hermetically separated from said internal cavity and adapted to receive said second rotor, said first rotor includes an annular lateral portion that is arranged around a separation lateral wall of said separation element and contains said first group of magnets, and said second rotor includes a lateral wall that is provided with said second group of magnets and faces said separation lateral wall.

3. The dosing apparatus according to claim 2, wherein said first group of magnets includes a plurality of first magnets with operative surfaces of said first magnets that face said second group of magnets and have positive polarity, and a plurality of second magnets with operative surfaces of said second magnets that face said second group of magnets and have negative polarity, and said first magnets and said second magnets are radially arranged around and along said rotation axis, angularly spaced and mutually alternated, so that each of said first magnets is arranged between two of said second magnets and vice versa.

4. The dosing apparatus according to claim 2, wherein said second group of magnets includes a plurality of third magnets with operative surfaces of said third magnets that face said first group of magnets and have positive polarity, and a plurality of fourth magnets with operative surfaces of said fourth magnets that face said first group of magnets and have negative polarity, and said third magnets and said fourth magnets are radially arranged around and along said rotations axis, angularly spaced and mutually alternated, so that each of said third magnets is arranged between two of said fourth magnets and vice versa.

5. The dosing apparatus according to claim 1, wherein said magnetic coupling system further includes a third group of magnets of said groups of magnets housed in said first rotor and a fourth group of magnets of said groups of magnets housed in said second rotor, said third group of magnets and said fourth group of magnets face each other and are arranged so as to exert a mutual magnetic attraction force directed along said rotation axis.

6. The dosing apparatus according to claim 5,
   wherein said first rotor includes a base portion that faces a frontal separation wall of said separation element and is provided with said third group of magnets, and
   wherein said second rotor includes a frontal wall that faces said frontal separation wall and is provided with said fourth group of magnets.

7. The dosing apparatus according to claim 5, wherein said third group of magnets include annular magnets of said third group of magnets and said fourth group of magnets include annular magnets of said fourth group of magnets, said annular magnets of said third group of magnets and said annular magnets of said fourth group of magnets are arranged coaxially to said rotation axis so that each operative surface of said third magnets faces one operative surface of said fourth magnets of opposite polarity.

8. The dosing apparatus according to claim 1, wherein said separation element includes a casing that extends towards said internal cavity and starts from a closing wall of said hopper, which is opposite to a terminal opening from which the product exits, and said casing forms an internal housing that is hermetically separated from said internal cavity and externally accessible.

9. The dosing apparatus according to claim 8, wherein said casing is adapted to receive said second rotor of said magnetic coupling system fixed to said end of said first driving shaft externally to said hopper.

10. The dosing apparatus according to claim 1, wherein said hopper includes a closing wall removably fixed to an upper portion of said hopper, and said separation element and said closing wall form a single body.

11. The dosing apparatus according to claim 1, wherein said separation element is made of non-magnetic material.

12. A dosing apparatus for dosing a product in at least one form between powder form and granule form within containers, the dosing apparatus comprising:
   a hopper provided with an internal cavity to contain the product;
   a dosing screw that is able to rotate about, and extends along, a rotation axis inside said hopper and through said internal cavity;
   a first driving shaft arranged to rotate said dosing screw;
   a magnetic coupling system to removably connect a first end of said dosing screw to said first driving shaft that is arranged externally to said hopper, said first end of said dosing screw being arranged inside said hopper, said first driving shaft being hermetically separated from said first end of said dosing screw by a separation element, and said separation element being integral with said hopper;
   a stirring element that is positioned inside said internal cavity and is able to rotate about said rotation axis;

a second driving shaft arranged to rotate said stirring element; and a further magnetic coupling system to removably connect a first end portion of said stirring element, which is arranged inside said hopper, to said second driving shaft, which is arranged externally to said hopper and is hermetically separated from said first end portion of said stirring element by said separation element, wherein said magnetic coupling system including groups of magnets adapted to magnetically transmit a driving torque from said first driving shaft to said dosing screw and to reversibly fasten, longitudinally along said rotation axis, said dosing screw to said first driving shaft, and wherein said further magnetic coupling system includes further groups of magnets to magnetically transmit a driving torque between said second driving shaft and said stirring element and to reversibly fasten, longitudinally along said rotation axis, said stirring element to said second driving shaft.

13. The dosing apparatus according to claim 12, wherein said further magnetic coupling system includes a third rotor, fixed to said first end portion of said stirring element inside said hopper and provided with a fifth group of magnets of said further groups of magnets, and a fourth rotor, fixed to an end of said second driving shaft externally to said hopper and provided with a sixth group of magnets of said further groups of magnets, and wherein said third rotor and said fourth rotor are mutually separated by said separation element and arranged so that said fifth group of magnets faces said sixth group of magnets so as to interact and generate a force of mutual magnetic attraction directed at least transversally to said rotation axis.

14. The dosing apparatus according to claim 12, wherein said hopper includes a closing wall removably fixed to an upper portion of said hopper to allow access to said internal cavity, to mount and dismount said stirring element.

15. The dosing apparatus according to claim 12, wherein said hopper includes a bottom portion provided with a pass-through cavity, that has a terminal opening through which the product exits and is arranged to receive a second operative end of said dosing screw and to cooperate with said dosing screw to dose the product, and said bottom portion of said hopper is removably fixed to an upper portion of said hopper in order to remove or insert said dosing screw from/in said hopper.

16. The dosing apparatus according to claim 12, wherein said magnetic coupling system includes a first rotor, which is fixed to said first end of said dosing screw inside said hopper and is provided with a first group of magnets of said groups of magnets, and a second rotor, which is fixed to an end of said first driving shaft externally to said hopper and is provided with a second group of magnets of said groups of magnets, and said first rotor and said second rotor are mutually separated by said separation element and arranged so that said first group of magnets and said second group of magnets substantially face each other so as to interact and generate a force of mutual magnetic attraction directed at least transversally to said rotation axis.

17. The dosing apparatus according to claim 16, wherein said separation element includes a casing that extends inside said internal cavity and forms an internal housing that is hermetically separated from said internal cavity and adapted to receive said second rotor, said first rotor includes an annular lateral portion that is arranged around a separation lateral wall of said separation element and contains said first group of magnets, and said second rotor includes a lateral wall that is provided with said second group of magnets and faces said separation lateral wall.

18. The dosing apparatus according to claim 17, wherein said first group of magnets includes a plurality of first magnets with operative surfaces of said first magnets that face said second group of magnets and have positive polarity, and a plurality of second magnets with operative surfaces of said second magnets that face said second group of magnets and have negative polarity, and said first magnets and said second magnets are radially arranged around and along said rotation axis, angularly spaced and mutually alternated, so that each of said first magnets is arranged between two of said second magnets and vice versa.

19. The dosing apparatus according to claim 17, wherein said second group of magnets includes a plurality of third magnets with operative surfaces of said third magnets that face said first group of magnets and have positive polarity, and a plurality of fourth magnets with operative surfaces of said fourth magnets that face said first group of magnets and have negative polarity, and said third magnets and said fourth magnets are radially arranged around and along said rotations axis, angularly spaced and mutually alternated, so that each of said third magnets is arranged between two of said fourth magnets and vice versa.

20. The dosing apparatus according to claim 16, wherein said magnetic coupling system further includes a third group of magnets of said groups of magnets housed in said first rotor and a fourth group of magnets of said groups of magnets housed in said second rotor, said third group of magnets and said fourth group of magnets face each other and are arranged so as to exert a mutual magnetic attraction force directed along said rotation axis.

* * * * *